United States Patent
Huang et al.

(10) Patent No.: US 8,216,710 B2
(45) Date of Patent: Jul. 10, 2012

(54) BATTERY HOLDING MECHANISM AND PORTABLE ELECTRONIC DEVICE USING THE SAME

(75) Inventors: Lucas Huang, Shenzhen (CN); Lee-Han Ng, Shenzhen (CN); Chien-Chun Huang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 354 days.

(21) Appl. No.: 12/536,320

(22) Filed: Aug. 5, 2009

(65) Prior Publication Data

US 2010/0099017 A1    Apr. 22, 2010

(30) Foreign Application Priority Data

Oct. 20, 2008    (CN) .......................... 2008 1 0305015

(51) Int. Cl.
*H01M 2/10* (2006.01)
*H01K 5/00* (2006.01)
*H01K 7/00* (2006.01)

(52) U.S. Cl. ........ 429/100; 429/96; 429/97; 361/679.01

(58) Field of Classification Search .................. 429/100, 429/96–99; 361/679.01
See application file for complete search history.

(56) References Cited

U.S. PATENT DOCUMENTS 4,031,295 A * 6/1977 Rigazio .......................... 429/100
6,490,436 B1 * 12/2002 Kaiwa et al. ................. 455/90.1

FOREIGN PATENT DOCUMENTS

CN    2733763 Y    10/2005
JP    09330687 A * 12/1997

OTHER PUBLICATIONS

Okuma, T., Machine translation of JP 09330687 A, Dec. 1997.*

* cited by examiner

*Primary Examiner* — Basia Ridley
*Assistant Examiner* — Sean P Cullen
(74) *Attorney, Agent, or Firm* — Altis Law Group, Inc.

(57) ABSTRACT

A battery holding mechanism for holding a battery in a portable electronic device, includes a bearing unit, a connecting unit connected to the bearing unit and an operating unit connected to the connecting unit. The bearing unit includes a bearing board for bearing the battery assembled in the portable electronic device thereon and an assembling component formed on the bearing board for assembling the bearing unit to the portable electronic device. The operating unit is configured for being operated to move the connecting unit and the bearing unit, thereby detaching the battery placed on the bearing board from the portable electronic device.

16 Claims, 5 Drawing Sheets

BATTERY HOLDING MECHANISM AND PORTABLE ELECTRONIC DEVICE USING THE SAME

BACKGROUND

1. Technical Field

The present disclosure relates to battery holding mechanisms for portable electronic device, and particularly to a flexible battery holding mechanism and a portable electronic device using the same.

2. Description of Related Art

Nowadays, many portable electronic devices (e.g., mobile phones and personal digital assistants) are widely used. Most portable electronic devices include batteries attached thereon to supply electric energy. Generally, a portable electronic device defines a receiving space to receive the battery therein. The received battery is electronically connected to inner circuits of the portable electronic device. When electric energy of the battery is low, the battery can be removed and replaced by a new battery.

In use, a battery should be tightly secured in a portable electronic device for maintaining a stable electronic connection. However, such tight structures may be inconvenient to access and remove the battery from the receiving space. Additionally, when removing the battery, the battery and the portable electronic device may be damaged by rubbing or crashing to each other caused by the tight securing.

Therefore, there is room for improvement within the art.

BRIEF DESCRIPTION OF THE DRAWINGS

Many aspects of the present battery holding mechanism and portable electronic device using the same can be better understood with reference to the following drawings. The components in the various drawings are not necessarily drawn to scale, the emphasis instead being placed upon clearly illustrating the principles of the present battery holding mechanism and portable electronic device using the same. Moreover, in the drawings, like reference numerals designate corresponding parts throughout the figures.

DETAILED DESCRIPTION

Figure 1:
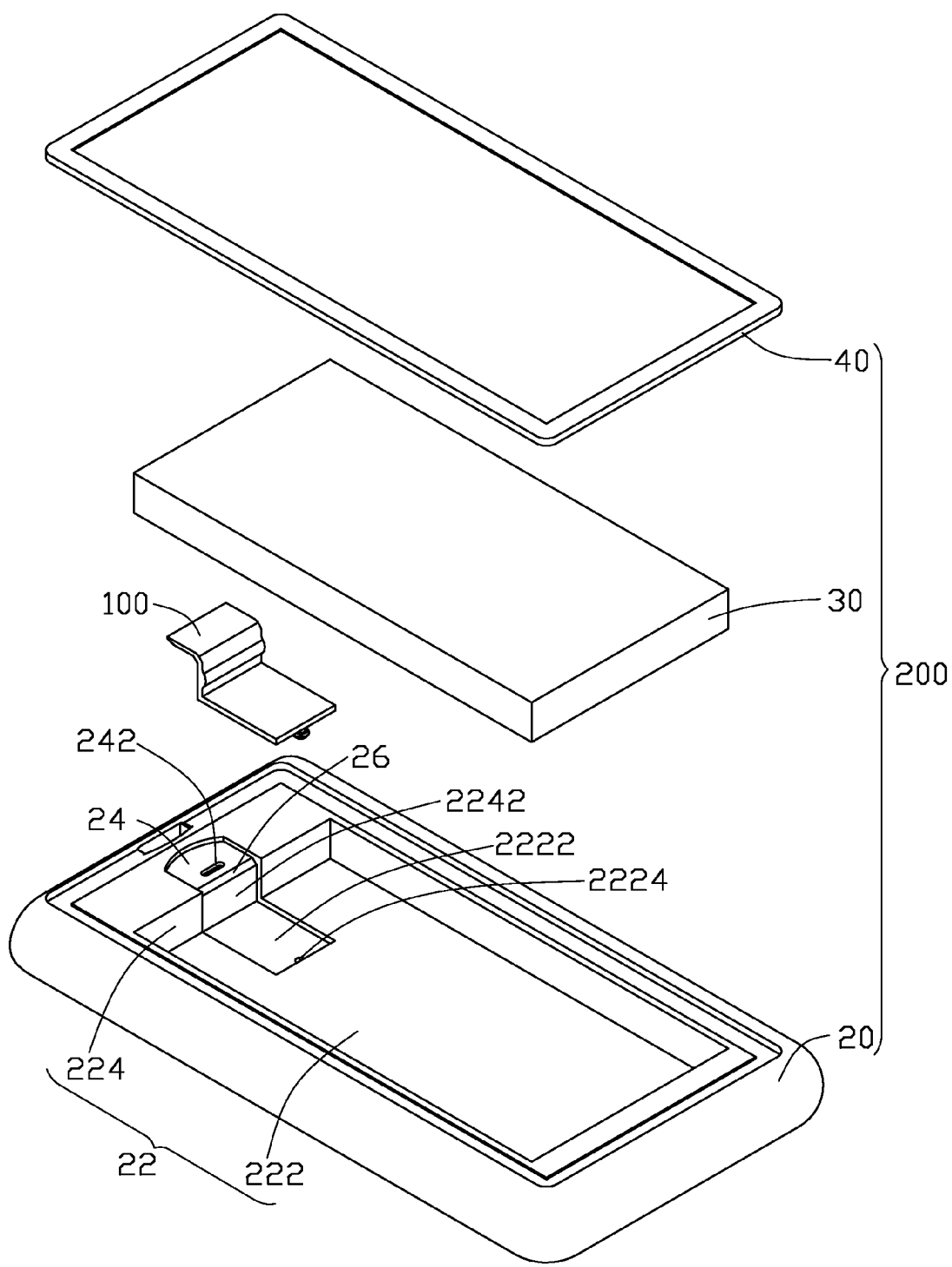
FIG. 1 is a schematic, disassembled view of a battery holding mechanism used in a portable electronic device, according to an exemplary embodiment.

FIG. 1 schematically shows a battery holding mechanism 100 according to an exemplary embodiment, which is used in a portable electronic device 200 such as a mobile phone, a digital camera, a personal digital assistant (PDA), etc.

Figure 2:
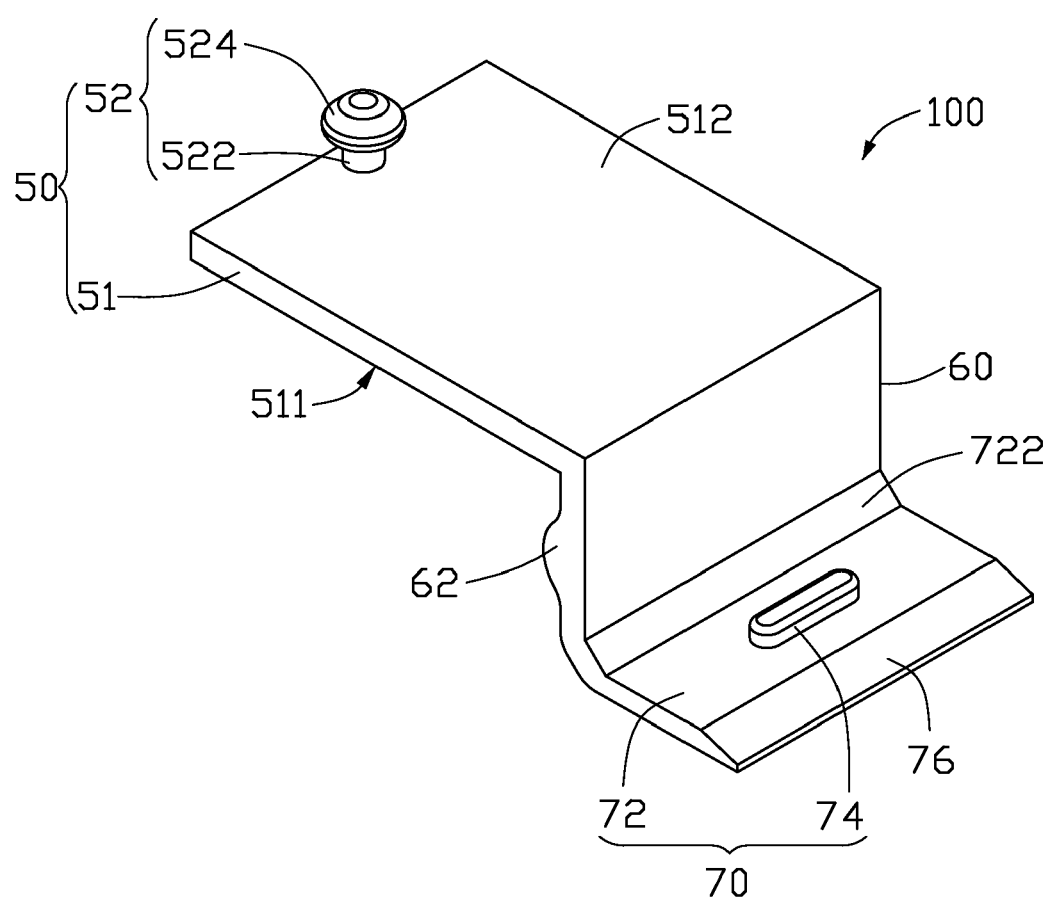
FIG. 2 is an enlarged view of the battery cover mechanism shown in FIG. 1.

Also referring to FIG. 2, the battery holding mechanism 100 includes a bearing unit 50, a connecting unit 60 and an operating unit 70. The bearing unit 50, the connecting unit 60 and the operating unit 70 are all made of flexible and elastic material, such as rubber or resin. The bearing unit 50 includes a bearing board 51 and an assembling component 52. The bearing board 51 is a planar board including two parallel opposite surfaces 511, 512. The assembling component 52 includes a cylindrical assembling pole 522 perpendicularly connected to an end of the surface 512 and an holding end 524 formed on a distal end of the assembling pole 522. As shown in FIG. 2, the diameter of the holding end 524 is larger than the diameter of the assembling pole 522.

The connecting unit 60 is a planar board perpendicularly connected to the surface 511, and the connecting unit 60 and the assembling component 52 are respectively positioned at two opposite ends of the bearing board 51. A middle portion of the connecting unit 60 protrudes to form a semi-cylindrical retaining portion 62. The retaining portion 62 and the bearing unit 50 are positioned on a same side of the connecting unit 60, and the retaining portion 62 extends parallel to the bearing board 51.

The operating unit 70 includes an operating portion 72, which is a planar board. A side of the operating portion 72 bends to form an inclined connecting component 722, and the operating portion 72 is connected to a side of the connecting unit 60 via the connecting component 722. The operating portion 72 and the bearing board 50 are respectively connected to two opposite surfaces of the connecting unit 60 and positioned at two opposite ends of the connecting unit 60. The operating portion 72 is positioned parallel to the bearing board 51 and perpendicular to the connecting unit 60, such that the battery holding mechanism 100 is step-shaped. Angles formed between the connecting component 722 and the connecting unit 60 or the operating portion 72 are both about 45 degrees. A central portion of the operating portion 72 protrudes to form a retaining protrusion 74, wherein the retaining protrusion 74 and the connecting portion 60 are positioned on a same side of the operating portion 72. An operating incline 76 is formed on a side of the operating portion 70 opposite to the connecting component 722.

The portable electronic device 200 includes a housing 20, a battery 30 and a battery cover 40. The housing 20 defines a recess 22 corresponding to the battery 30 in a central portion thereof, and then a planar bottom 222 and a side wall 224 perpendicular to the bottom 222 corresponding to the recess 22 are formed on the housing 20. An end of the bottom 222 partially recesses to form a rectangular assembling recess 2222 corresponding to the bearing board 51. An assembling hole 2224 corresponding to the assembling component 52 through the housing 20 is defined in a bottom of the assembling recess 2222. A size of the assembling hole 2224 is less than a size of the holding end 524. The side wall 224 partially recesses to form a rectangular side groove 2242 communicating with the assembling recess 2224 and corresponding to the connecting unit 60. The housing 20 also defines an operating recess 24 communicating with the connecting unit 60 and corresponding to the operating unit 70 at an end thereof. The bottom of the operating recess 24 defines a retaining hole 242 corresponding to the retaining protrusion 74 in a central portion thereof, and a connecting incline 26 corresponding to the connecting component 722 and adjoining the side groove 2242 is formed on a side of the bottom of the operating recess 24. The battery cover 40 is capable of covering the recess 22.

Figure 3:
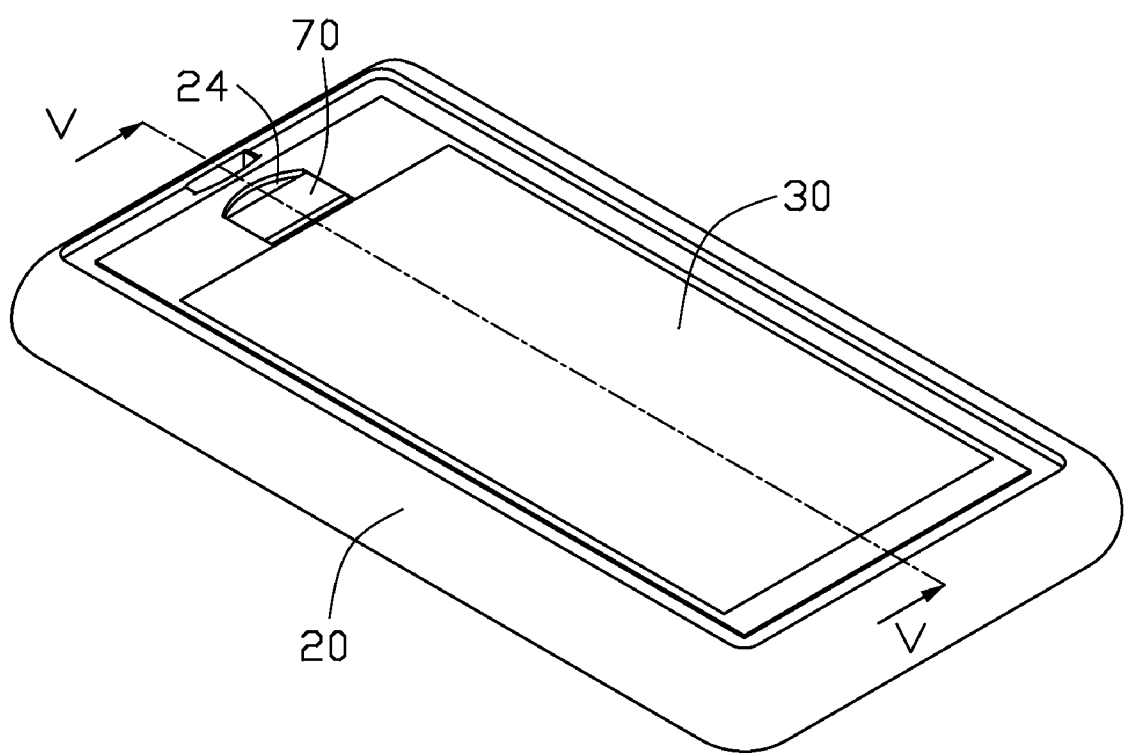
FIG. 3 is a schematic, assembled view of the battery holding mechanism and the portable electronic device shown in FIG. 1, wherein a battery is received in the portable electronic device.
Figure 4:
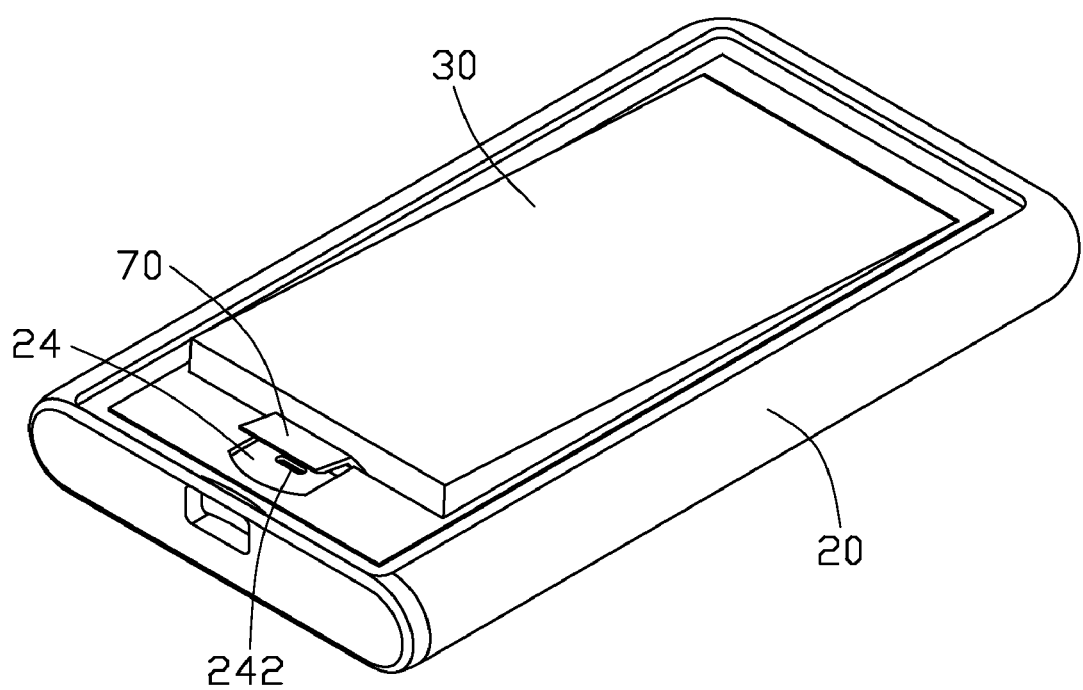
FIG. 4 is similar to FIG. 3, but shown in another view angle, and the battery is being removed from the portable electronic device.
Figure 5:
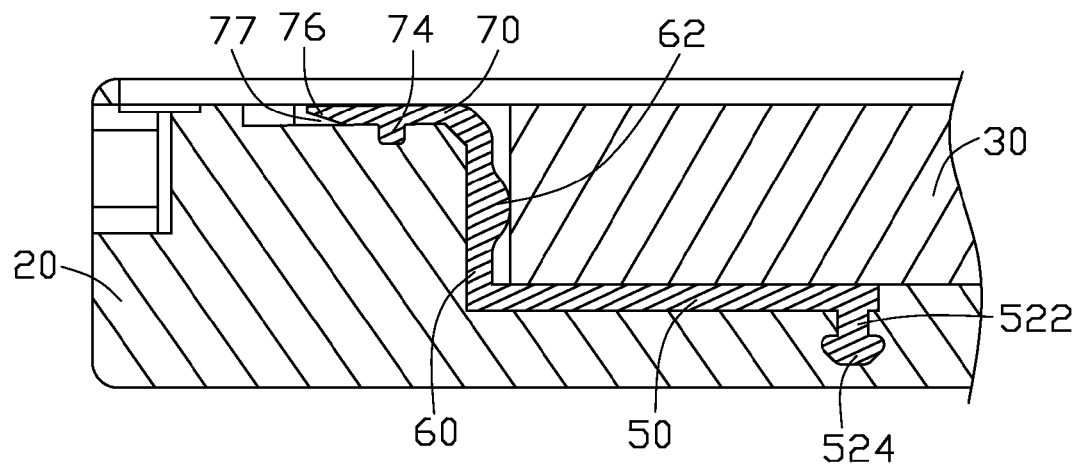
FIG. 5 is a cut-away view along the line V-V shown in FIG. 3.

Also referring to FIG. 3, FIG. 4 and FIG. 5, in assembly, the bearing board 51 is received in the assembling recess 2222, with the surface 512 facing the bottom of the assembling recess 2222. Thus, the holding end 524 is compressed and inserted into the assembling hole 2224. The bearing board 51 is pressed until the holding end 524 passes through the assembling hole 2224. Thus, the assembling pole 522 is received in the holding hole 2224, the holding end 524 and the bearing board 51 are respectively positioned at two sides of the housing 20, and the holding end 524 resiles to prevent the battery holding mechanism 100 separating from the housing 20. The connecting unit 60 is received in the side groove 2242. The connecting component 722 is attached to the connecting incline 26. The operating unit 70 is received in the operating recess 24, and the retaining protrusion 74 is inserted into the retaining hole 242. In this way, the battery holding mechanism 100 is assembled to the housing 20. Understandably, the operating incline 76 is positioned towards the bottom of the operating recess 24, and then a gap 77 is formed between the out side of the operating unit 70 and the housing 20 (shown in FIG. 5). The retaining portion 62 is positioned opposite to the bottom of the operating recess 24, i.e., exposed outwards.

The battery 30 is received in the recess 22. The inclined connecting component 722 can facilitate the receiving operation. The assembled battery 30 is placed on the bearing board 51 and compresses the exposed retaining portion 62. Finally, the battery cover 40 is assembled to the housing 20 to cover the battery 30, thus the portable electronic device 200 is completed.

When the portable electronic device 200 is used, the retaining portion 62 compressed by the received battery 30 generates a rebounding tendency to press the battery 30 towards the side wall 224. Thus, the battery holding mechanism 100 cooperates with the housing 20 to secure the battery 30 in the containing recess 22 to maintain a stable electric connection between the battery 30 and the inner circuits of the portable electronic device 200. The elastic bearing board 51 and retaining portion 62 can also prevent the battery 30 from rubbing or crashing the housing 20.

When the battery 30 needs to be changed, the battery cover 40 is removed. The operating unit 70 is firstly disengaged from the housing 20. The gap 77 and the operating incline 76 can facilitate the operation of moving the operating unit 70. The connecting unit 60 and the bearing board 50 are then pulled away from the housing 20, and the battery 30 is driven out from the recess 22. The holding end 524 prevents the battery holding mechanism 100 separating from the housing 20, and the assembling pole 522 is bent such that the bearing board 51 can be adequately moved to drive the battery 30 out.

The battery holding mechanism 100 has a simple structure and low cost. When the portable electronic device 200 is used, the battery 30 is held stably and is protected from rubbing or crashing by the battery holding mechanism 100. When the battery 30 is taken out from the recess 22, it can be easily driven out by the operating unit 70. Thus, the battery 30 can be easily detached from the housing 20 and is protected from most ribbing or crashing to the housing 20.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A battery holding mechanism for holding a battery in a portable electronic device, comprising:
    a bearing unit including a bearing board for bearing the battery assembled in the portable electronic device and an assembling component formed on the bearing board for assembling the bearing unit to the portable electronic device, the assembling component including an assembling pole connected to the bearing board and a holding end formed on a distal end of the assembling pole, and a diameter of the holding end being larger than a diameter of the assembling pole;
    a connecting unit connected to the bearing unit; and
    an operating unit connected to the connecting unit and configured for being operated to move the connecting unit and the bearing unit, thereby detaching the battery placed on the bearing board from the portable electronic device.

2. The battery holding mechanism as claimed in claim 1, wherein the bearing unit, the connecting unit and the operating unit are made of flexible and elastic material.

3. The battery holding mechanism as claimed in claim 1, wherein the connecting unit and the assembling component are respectively connected to two opposite surfaces of the bearing board and positioned at two opposite ends of the bearing board.

4. The battery holding mechanism as claimed in claim 1, wherein the connecting unit is a board perpendicularly connected to the bearing board and includes a retaining portion formed thereon for retaining the battery bearing on the bearing unit.

5. The battery holding mechanism as claimed in claim 4, wherein the retaining portion is a semi-cylinder protruding from the connecting unit, the retaining portion and the bearing unit are positioned on a same side of the connecting unit, and the retaining portion extends parallel to the bearing board.

6. The battery holding mechanism as claimed in claim 1, wherein the operating unit includes an operating portion, which is a board perpendicularly connected to the connecting unit and positioned parallel to the bearing board, and the operating portion and the bearing board are respectively connected to two opposite surfaces of the connecting unit and positioned at two opposite ends of the connecting unit.

7. The battery holding mechanism as claimed in claim 6, wherein the operating unit further includes a retaining protrusion formed thereon for retaining with the portable electronic device.

8. The battery holding mechanism as claimed in claim 6, wherein a side of the operating portion bends to form an inclined connecting component, and the operating portion is connected to a side of the connecting unit via the connecting component.

9. The battery holding mechanism as claimed in claim 2, wherein the assembling component engages with a housing of the portable electronic device to prevent the battery holding mechanism from being separated from the housing.

10. The battery holding mechanism as claimed in claim 9, wherein the housing defines a recess configured for receiving the battery, the recess is defined by a planar bottom and a side wall perpendicular to the bottom, an end of the bottom partially recesses to form a rectangular assembling recess, and the assembling pole is received in the assembling hole and having a size that is less than a size of the holding end, thereby respectively positioning the bearing board and the holding end at two sides of the housing and preventing the battery holding mechanism from being separated from the housing.

11. The battery holding mechanism as claimed in claim 7, wherein both the retaining protrusion and the connecting unit are positioned at a same surface of the operating portion.

12. A portable electronic device, comprising:
    a battery holding mechanism, which is made of elastic material and includes:
        a bearing unit including a bearing board for bearing a battery assembled in the portable electronic device and an assembling component formed on the bearding board for assembling the bearing unit to the portable electronic device, the assembling component including an assembling pole connected to the bearing board and a holding end formed on a distal end of the assembling pole, and a diameter of the holding end being larger than a diameter of the assembling pole;

a connecting unit connected to the bearing unit; and an operating unit connected to the connecting unit and configured for being operated to move the connecting unit and the bearing unit, thereby detaching the battery placed on the bearing board from the portable electronic device; and a housing defining an assembling hole, a size of the assembling hole being less than the holding end;

wherein the assembling pole is received in the assembling hole, and the bearing board and the holding end are respectively positioned at two opposite sides of the housing, such that the battery holding mechanism is prevented from being separated from the housing.

13. The portable electronic device as claimed in claim 12, wherein both the bearing board and the connecting unit are substantially planar boards, and the connecting unit and the assembling pole are respectively perpendicularly connected to two opposite surfaces of the bearing board.

14. The portable electronic device as claimed in claim 13, wherein the connecting unit and the assembling pole are respectively positioned adjacent to two opposite ends of the bearing board.

15. The portable electronic device as claimed in claim 14, the operating unit includes an operating portion, which is substantially a planar board perpendicularly connected to the connecting unit and positioned parallel to the bearing board, and the operating portion and the bearing board are respectively connected to two opposite ends of the connecting unit and positioned on two opposite surfaces of the connecting unit.

16. The portable electronic device as claimed in claim 15, wherein the operating unit further includes a retaining protrusion formed thereon for engaging with the housing to retain the operating unit, and both the retaining protrusion and the connecting unit are positioned at a same surface of the operating portion.

* * * * *